United States Patent [19]

Larsen

[11] Patent Number: 4,981,740

[45] Date of Patent: Jan. 1, 1991

[54] ACID RESISTANT CONCRETE ARTICLES, ESPECIALLY SULFUR CONCRETE PIPES, AND A METHOD OF MANUFACTURING SAID ARTICLES

[75] Inventor: Leif H. A. Larsen, Svenstrup Jylland, Denmark

[73] Assignee: KKKK A/S, Copenhagen, Denmark

[21] Appl. No.: 326,617

[22] Filed: Mar. 21, 1989

[30] Foreign Application Priority Data

Mar. 10, 1989 [DK] Denmark ............... 117/89

[51] Int. Cl.$^5$ ............................................. C04B 28/36
[52] U.S. Cl. .................................. 428/34.4; 106/627; 428/34.5
[58] Field of Search ............... 528/389; 524/609, 494, 524/788; 106/70, 95, 97, 90; 501/140; 138/175, 177

[56] References Cited

U.S. PATENT DOCUMENTS

| | | | |
|---|---|---|---|
| 3,954,480 | 6/1974 | Inderwick | 106/90 |
| 4,025,352 | 5/1977 | Leutner et al. | 106/70 |
| 4,058,500 | 11/1977 | Vroom | 260/42.24 |
| 4,134,775 | 1/1979 | Schwoegler | 106/286.8 |
| 4,188,230 | 2/1980 | Gillot et al. | 106/70 |
| 4,256,499 | 3/1981 | Terrell | 106/70 |
| 4,293,463 | 10/1981 | Vroom | 260/42.24 |
| 4,302,255 | 11/1981 | Kidwell, Jr. et al. | 106/275 |
| 4,311,826 | 1/1982 | McBee et al. | 528/389 |
| 4,332,911 | 6/1982 | Nimer et al. | 501/140 |
| 4,332,912 | 6/1982 | Albom | 501/140 |
| 4,348,313 | 9/1982 | McBee et al. | 524/788 |
| 4,387,167 | 6/1983 | Kidwell, Jr. et al. | 501/140 |
| 4,391,969 | 7/1983 | McBee et al. | 528/389 |
| 4,414,385 | 11/1983 | Swanson | 524/494 |
| 4,426,458 | 1/1984 | Woodhams | 501/140 |
| 4,484,950 | 11/1984 | Hinkebein | 106/287.29 |
| 4,496,659 | 1/1985 | Nimer | 501/140 |
| 4,600,373 | 7/1986 | Swanson | 425/144 |
| 4,828,619 | 5/1989 | Matsushita et al. | 106/95 |

FOREIGN PATENT DOCUMENTS

| | | |
|---|---|---|
| 151378 | 6/1980 | Denmark . |
| 0048106 | 3/1982 | European Pat. Off. . |
| 0346626 | 5/1989 | European Pat. Off. . |
| 1649 | 7/1856 | United Kingdom . |

OTHER PUBLICATIONS

Hawkins et al., *Sulphur Concrete-A New Material for Sewer Pipes in Highly Corrosive Conditions.*

Development of Sulphur Concrete; T. A. Sullivan; for: Presentation of The International Symposium and Workshop on Sulphur Concrete—Oct. 14–15, 1986, Washington, D.C.

Sulfur Concrete; W. C. McBee; A New Construction Material Reprint of article which appeared in Oct.-/Nov., 1985, issue of Minerals & Materials, U.S. Bureau of Mines, pp. 31–37.

Prefabricated Parts Made of Sulphur Concrete; Alfred Ecker; International Symposium & Workshop—Oct. 14–15, 1986, Washington, D.C.

*Primary Examiner*—William R. Dixon, Jr.
*Assistant Examiner*—Alan Idright
*Attorney, Agent, or Firm*—Hopgood, Calimafde, Kalil, Blaustein & Judlowe

[57] ABSTRACT

Acid resistant concrete articles, especially sulfur concrete pipes manufactured from a material formulated on the basis of a composition of portland cement concrete suitable for the manufacture of pipes by means of the dry casting method, the volume of portland cement, filler and water being replaced by a substantially equivalent volume of sulfur cement and filler, while the amount of other components remains substantially unchanged. The sulfur concrete pipes are manufactured by mixing the components of the material and adjusting the mixture to a temperature, where sulfur cement is liquid. At this temperature the mixture is cast while being subjected to vigorous vibration, using a casting mould preheated to a temperature of up to 160° C. The cast pipes can be removed from the mould immediately after casting. After only 24 hours they have obtained sufficient strength for being delivered to a building site. Sulfur concrete pipes are most suitable in aggressive environments since they are resistant to acid and salt attacks.

15 Claims, No Drawings

ACID RESISTANT CONCRETE ARTICLES, ESPECIALLY SULFUR CONCRETE PIPES, AND A METHOD OF MANUFACTURING SAID ARTICLES

FIELD OF THE INVENTION

The present invention relates to acid resistant concrete articles, especially sulfur concrete pipes, and a method of manufacturing said articles.

BACKGROUND ART

U.S. Pat. Nos. 4,311,826, 4,348,313 and 4,391,969 disclose sulfur cement compositions comprising elemental sulfur and a plasticizer. The plasticizer is usually present in an amount of approx. 5% and comprises a mixture of dicyclopentadiene and oligomers of cyclopentadiene in a ratio of 1:1. U.S. Pat. No. 4,293,463 discloses a sulfur cement composition comprising sulfur, a viscosity-increasing, surface-active, finely divided particulate stabilizer, such as fly ash, and an olefinic hydrocarbon polymeric material derived from petroleum and having a non-volatile content larger than about 50% by weight and having a minimum Wijs iodine number of about 100 cg/g, said polymer being capable of reacting with sulfur to form a sulfur-containing polymer, (cf. column 2, lines 29–37). Corresponding sulfur cement compositions are described in U.S. Pat. No. 4,058,500.

Sulfur cement is used to replace conventional cement for the preparation of concrete. In contrast to conventional portland cement concrete the obtained sulfur concrete is distinguished by being resistant to salt and acid attacks. Sulfur cement is the only binder when preparing sulfur concrete. Sulfur cement becomes liquid when heated to a temperature of up to approx. 135° C. thus rendering the sulfur concrete as workable as conventional concrete. During the cooling process usually lasting only a few hours the sulfur concrete develops unique properties, such as compressive strengths of approx. 40 to 60 MPa, flexural strengths of approx. 8 to 12 MPa, high impact strength, high wear resistance, absolute water impermeability, resistance to salt and acid attacks as well as resistance to freeze thaw exposure. Examples of sulfur concrete and its preparation are disclosed in U.S. Pat. Nos. 4,025,352, 4,496,659, 4,332,911 and 4,332,912.

Due to these excellent properties sulfur concrete has been applied in many fields of industry dealing with aggressive environment, where conventional portland cement concrete disintegrates. Typical fields of application, where the particular properties of sulfur concrete are of special interest, include the manufacture of floors, coatings, foundations, walls, acid reservoirs, tanks, sewer systems and the like.

Although there are many good reasons for using sulfur concrete no acceptable method for the manufacture of sulfur concrete pipes from sulfur concrete has yet been found. Various methods for the manufacture of such pipes have indeed been suggested, but none of them can be considered satisfactory from a technical and economical point of view. Examples of known methods for the manufacture of sulfur concrete articles are mentioned in the following patent specifications.

U.S. Pat. No. 3,954,480 discloses concrete compositions, concrete articles and methods of producing the articles, where a portion of the cement is replaced by sulfur, preferably plasticized sulfur. The patent thus discloses a combination of sulfur concrete and conventional concrete. During the production of the concrete articles the material is shaped into the desired shape and is compacted, whereupon the product is left to stand in order to permit partial or complete hydration of the cement therein. The hydratized product is then heated to a temperature above the melting point of sulfur to plastify the sulfur, whereupon the article is cooled and ready to be used. This method is very time-consuming since the partial or complete hydratization of the cement requires a long time and the heat treatment is usually carried out during heating for between 1 and 5 h at a temperature of between 121° and 177° C. Moreover, due to the content of conventional cement, it is impossible to obtain all the above advantages of sulfur cement.

U.S. Pat. No. 4,134,775 discloses articles to be used as structural members, such as bricks, building blocks, mouldings, cornices or the like substantially comprising a 3-dimensional matrix of solidified elemental sulfur and a solid, particulate, inorganic material uniformly distributed throughout the matrix, said particulate, inorganic material amounting to 20 to 80% by weight of the article. At least one part of the particulate, inorganic material is unfragmented fly ash amounting to 20 to 60% by weight of the article. The particulate, inorganic material has a particle size in the range of from 0.0005 to 10.0 mm, the maximum particle size being small in comparison to the smallest dimension of the finished article. The article is manufactured by mixing sulfur concrete at room temperature and pouring the mixture into a mould. The mixture is then heated until the sulfur has melted. The necessary strength of the article is obtained during the subsequent cooling. Such an article has a hardness significantly greater than the one of solidified sulfur and a compressive strength higher than the one obtained with aged, cast concrete. The produced articles can also be extruded in form of pellets to be remelted for in situ use. The method disclosed in U.S. Pat. No. 4,134,775 is time-consuming and only applicable in connection with small articles and can thus not be used for the manufacture of pipes on an industrial scale.

U.S. Pat. No. 4,256,499 discloses shaped sulfur concrete articles and their production from a mouldable composition of mineral aggregate, mineral binder, a sulfur component, such as elemental sulfur, and a liquid vehicle, such as water. The mixture is compacted and formed into a shaped body at an elevated compacting pressure, dried to volatilize the liquid vehicle and heated to melt the sulfur. The article is subsequently cooled to solidify the sulfur, whereby the mineral materials are bonded into a matrix with the sulfur. The use of liquid vehicle renders the method inconvenient and time-consuming, as subsequent to compacting and casting the material has to be dried until substantially all liquid vehicle is volatilized.

U.S. Pat. No. 4,426,458 discloses fiber-reinforced sulfur concrete compositions, which according to the specification are proposed for the preparation of concrete articles, such as paving slabs, structural members, curbings, gutters and pipes. The sulfur concrete composition comprises sulfur cement, aggregate and fiber elements in form of bundles of filaments with a length of at least 3 cm. The aggregate may have the following distribution of particle sizes:

15–80% by weight of a particle size larger than 4.75 mm, preferably 1.5 to 4 mm, in diameter 5-85% by weight of a particle size of between 150 μm and 4.75 mm in diameter 5-15% by weight of a particle size of less than approx 150 μm in diameter.

The preparation of the sulfur concrete articles according to this specification may be carried out by mixing the preheated aggregate with melted sulfur and fiber elements in a mixer at between approx. 120 and 140 C. Subsequently the hot mixture is cast. The patent specification deals exclusively with the problems connected with fiber-reinforcing. The specification does not contain any reference allowing the industrial-scale manufacture of pipes by a person skilled in the art.

EP Patent application No. 0,048,106 Al discloses sulfur compositions including sulfur concrete, comprising particulate, inorganic aggregate bonded together in a matrix of the sulfur component having a plurality of small, entrained cells. According to the specification it is suggested that articles, such as paving slabs, structural members, curbings, gutters, pipes and the like, are to be manufactured by casting such sulfur concretes. It is, however, not described how to manufacture pipes. The entrained cells can be admixed the sulfur component in various ways during its preparation, said cells comprising a gas, such as air, oxygen, nitrogen, carbon dioxide or halocarbons, or a finely divided, porous, particulate material. In a preferred embodiment of the preparation of sulfur concrete the inorganic aggregate is first preheated to a temperature ranging from approx. 115° to approx. 160° C, whereupon it is mixed with the liquid sulfur cement in a suitable mixer until a substantially homogeneous mixture is obtained, the temperature being maintained throughout the mixing. The hot mixture is subsequently cast using a conventional plant. The moment for introducing the small entrained cells depends on the cell-entraining method employed. This patent application discloses methods for the admixing of air but does not teach how to manufacture sulfur concrete pipes on an industrial scale.

The disadvantage of the preparation of the above and other sulfur concrete articles is in general that the molten sulfur concrete is of low viscosity. This may cause problems connected with for example the necessity for a large number of moulds, or cleaning the moulds between two casts due to the material sticking to the mould walls, or shrinkage resulting in incorrect final dimensions, or precipitation of aggregate or segregation of aggregate and molten sulfur during the cooling period. It has therefore been the general opinion of people skilled in the art that the manufacture of sulfur concrete pipes requires a special plant and particular handling.

The above opinion among people skilled in the art that the manufacture of pipes from sulfur concrete is a very difficult task, has been further supported by the general knowledge among those skilled in the art that 10 years ago a Canadian manufacturer went bankrupt in a futile attempt at manufacturing sulfur concrete pipes. A U.S. manufacturer was also forced to abandon the manufacture of sulfur concrete pipes after an investment of 1 mio U.S.-dollars.

Moreover, at the International Sulfur Concrete Symposium & Workshop, arranged by The Sulfur Institute, Oct. 14-15, 1986, Washington, D.C., Alfred Ecker (from OMV Aktiengesellschaft, Austria) communicated that "aggregate grading according to the specifications of portland cement concrete is unsatisfactory for sulfur concrete". With respect to the possibility of manufacturing pipes from sulfur concrete he communicated that the manufacture by means of the centrifugal method caused problems with segregation and internal tensions. Further A. Ecker communicated that "prefabrication of sulfur concrete parts seems to be very easy, but casting, vibrating and mould construction require extensive experience in that sulfur concrete is a thermoplastic material for which specialized handling is necessary". "The transmission of sulfur concrete technology from laboratory to commercial production is difficult and expensive". At this symposium the lecturers Thomas A. Sullivan (Consultant) and William McBee (U.S. Bureau of Mines) expressed corresponding opinions.

Several methods for the manufacture of pipes from portland cement concrete are known, for example the centrifugal method requiring complex equipment, the so-called wet method requiring long setting periods prior to demoulding and the dry casting method. The dry casting method involves vigorous vibration thus tightly compacting the solid particles in such a way that portland cement concrete pipes can be demoulded immediately after casting.

Hardening of portland cement concrete pipes is due to a chemical reaction between portland cement and water as well as optional pozzolanas and additives. Usually 28 days are considered necessary for complete hardening. Thus the portland cement concrete pipes have a low strength during the first few days subsequent to casting.

Portland cement concrete pipes are very sensitive to drying out, especially during the first days after casting since the chemical reaction requires water. As a result the quality of the finished portland cement concrete pipes varies greatly depending on the hardening conditions.

Portland cement concrete pipes are not 100% waterimpermeable, since portland cement concrete has always a more or less closed capillary pore system. Aggressive substances, such as salts and acids, easily penetrate the concrete and disintegrate it.

Portland cement concrete pipes do thus not resist acid attacks, for example by sulfuric acid. Due to various bacteria hydrogen sulfide is frequently formed in large sewer system. On the top part of a sewer pipe hydrogen sulfide is oxidized to sulfuric acid, said acid rapidly corroding and disintegrating portland cement concrete pipes. This problem occurs particularly in warm climates. It is, for example, necessary to exchange the entire sewer system of Los Angeles.

Portland cement concrete for the manufacture of pipes can be prepared from a mixture of fine aggregate (aggregate particles of less than 4 mm) and cement or a mixture of fine aggregate and coarse aggregate (aggregate particles of more than 4 mm) and cement. Typical compositions comprise:

| | |
|---|---|
| portland cement | 200-400 kg/m$^3$ |
| fly ash | 0-150 kg/m$^3$ |
| fine aggregate | 800-1800 kg/m$^3$ |
| coarse aggregate | 0-1000 kg/m$^3$ |
| water | 120-140 kg/m$^3$ |

Moreover various chemical and mineral additives can be employed.

Contrary to sulfur concrete, portland cement concrete cannot be cast at temperatures below 0° C. due to the presence of water.

Today methods are known to coat portland cement concrete pipes with, for example, epoxy. Such methods are, however, expensive and connected with various disadvantages. Owing to the health risk involved in handling epoxy, such as its carcinogenous properties, safety requirements are extensive. Moreover it is not easy to ensure a sufficient impermeability of the coating. This also applies to another form of coating, where the concrete pipe is lined with plastic material. In this case great problems concerning impermeability arise especially where the pipes are joint.

In Denmark as well as in all other industrial countries there is an increasing demand for corrosion-resistant pipes in connection with the exchange of existing pipe systems as well as for new systems.

As mentioned above it has not yet been possible to manufacture sulfur concrete pipes in a satisfactory manner in such a way that such pipes can be used in areas where conventional portland cement concrete pipes are not resistant enough. There is thus a great demand for sulfur concrete pipes manufactured in an economic and effective manner, such as by using existing conventional plants for the manufacture of portland cement concrete pipes.

SUMMARY OF THE INVENTION

According to the invention it has surprisingly been shown that such sulfur concrete pipes are manufacturable from a material formulated in analogy with compositions of portland cement concrete suitable for the manufacture of pipes by means of the dry casting method, said analogy being based on a principle to be explained in greater detail below.

According to this principle the paste components of portland cement concrete, i.e. cement, filler and water, are replaced by substantially an equivalent volume of sulfur paste, i.e. sulfur cement and filler. The other components, i.e. especially aggregate and air, remain substantially unchanged with respect to volume and distribution of aggregate particle size. To obtain the described analogy the mixing and casting are carried out at a temperature where sulfur paste has the same rheological properties as portland cement paste at normal casting temperatures. A suitable temperature of the sulfur paste is in the range of between 120° and 150° C., especially between 130° and 140° C.

When employing the above analogy a material composition is obtained, which can be cast while being subjected to vigorous vibration. This ensures that the mould is filled completely and that the finished pipe is incollapsible immediately after the casting, i.e. immediately thereafter the pipe can be removed from the mould (demoulded). Such a composition of the material and such casting conditions ensure a tight compaction of the particulate material. The individual particles are substantially in contact with each other since they are only surrounded by a thin layer of sulfur cement.

The object of the present invention is to provide a composition of sulfur concrete rendering said concrete suitable for the manufacture of pipes substantially according to the known dry method for the manufacture of portland cement concrete pipes, as well as a method of manufacturing sulfur concrete pipes, said method being carried out on e.g. existing conventional plants for the manufacture of portland cement concrete pipes by means of the dry casting method.

The object of the invention is accomplished by acid resistant concrete articles, especially sulfur concrete pipes manufactured from a material the composition of which is formulated on the basis of the composition of a portland cement concrete suitable for pipe manufacture by means of the dry casting method, the volume of portland cement, filler and water being replaced by a substantially equivalent volume of sulfur cement and filler.

Sulfur concrete pipes according to the invention comprise sulfur concrete articles cast while being subjected to vigorous vibration, whereafter they are immediately removed from the mould and are able to stand without support. Such articles can, for example, comprise pipes for sewer systems. It is, of course, also possible to manufacture other, not easily castable or pourable articles having an intricate shape and/or such a size rendering the manufacture by means of simple casting or pouring difficult. It is not necessarily important whether the articles have a shape which can be defined as pipe-shaped.

The sulfur cement for the inventive sulfur concrete pipes can be selected among any type of sulfur cement. Sulfur cement substantially comprises elemental sulfur, which can be unmodified or modified in different ways. Non-restrictive examples of sulfur cement include those described in the above U.S. Pat. Nos. 4,311,826, 4,348,313, 4,391,969, 4,293,463 and 4,058,500. Sulfur cement is typically used in amounts of between 5 and 30% by volume, preferably between 7 and 14% by volume.

Apart from sulfur cement the sulfur paste also comprises a filler having a particle size of up to 0.25 mm. This corresponds substantially to the limits of the particle size in conventional portland cement. The average particle size is usually 0.016 mm, which also corresponds to the average particle size of portland cement and fly ash. Depending on the type of aggregate in the concrete mixture the filler may vary in size and amount and may optionally comprise two or more different types of material. To ensure a tight or dense compaction of the solid particles it is necessary to use an amount of filler depending on the amount of sulfur cement. As a result of the tight compaction the sulfur concrete pipes can be removed from the moulds immediately after the casting without loosing their shape so that the pipes do not collapse. The filler content moreover ensures that a suitable paste of sulfur cement and filler is obtained so that the sulfur cement does not segregate from the sulfur concrete mixture. The filler also ensures that the manufactured sulfur concrete pipes are sufficiently tight or dense. Examples of suitable fillers include fly ash, pozzolanas, mineral filler, such as silica flour or rock flour, or mixtures thereof. Any filler fulfilling the above requirements is suitable provided that the manufactured sulfur concrete pipes have the desired quality, such as with respect to acid resistance, for example to sulfuric acid. The filler is usually present in an amount ranging from 3 to 40% by volume, preferably from 10 to 20% by volume of the sulfur concrete.

Usable aggregates include conventional aggregate. Aggregate having a particle size of less than 4 mm is termed "fine aggregate", whereas aggregate having a particle size of more than 4 mm is termed "coarse aggregate". The distribution of aggregate particle sizes is essential for the casting as well as for the properties of the finished product. The distribution of aggregate particle sizes in the present invention may be exactly the same as the distribution of aggregate particle sizes in a corresponding portland cement concrete suitable for the manufacture of pipes. By using an equivalent distribution of aggregate particle sizes corresponding properties during casting are obtained. The distribution of aggregate particle sizes is variable depending on the thickness of the article. Advantageously large particles are used for a large thickness. A typical sulfur concrete mixture comprises between 0 and 70% by volume of coarse aggregate, preferably between 30 and 45% by volume, and between 10 and 80% by volume of fine aggregate, preferably between 28 and 40% by volume.

The finished sulfur concrete pipes usually comprise between 1 and 10% by volume of air, preferably between 2 and 6% by volume, more preferred between 3 and 5% by volume, and most preferred about 4% by volume. The air is present in form of air bubbles entrapped during the mixing of the sulfur concrete. An air content in the above range, such as between 2 and 6% by volume, has no negative influence on the quality of the concrete, for example with respect to impermeability, since the air bubbles are small and moreover not interconnected. On the contrary an air content in the above range has a positive effect on the finished pipes, as it reduces internal tensions in the concrete during the shrinkage caused by cooling.

Finally, if desired, the sulfur concrete pipes may comprise additives and/or adjuvants. Examples of such adjuvants include substances for obtaining a microporous structure having an air content of for example between 4 and 8% by volume. Usually the amount of additives and/or adjuvants does not exceed 10% by volume, for example not more than 5% by volume, 3% by volume or 1% by volume, calculated on the basis of volume of the sulfur concrete.

It is furthermore possible to improve the strength of the sulfur concrete pipes by adding a reinforcing material, such as fibers or fiber elements in an amount ranging from 0 to 5% by volume. Adding such fibers or fiber elements considerably increases both the compressive and flexural strengths. Examples of fibers used in the inventive sulfur concrete include plastic fibers, glass fibers and steel fibers.

The composition of sulfur concrete for the manufacture of pipes corresponds, as previously mentioned, to the composition of conventional portland cement concrete for the manufacture of pipes, ensuring that the above analogy is fulfilled. Following the analogy, substantially the same volume of fine aggregate, coarse aggregate, air and additives and/or adjuvants as well as substantially an equivalent volume of paste components is used. The paste components of portland cement concrete are portland cement, filler and water, whereas the paste components of sulfur concrete are sulfur cement and filler. To ensure the analogy the sulfur concrete is preferably formulated in such a way that the volume of sulfur cement is substantially equivalent to the volume of water in portland cement concrete, while the volume of filler is substantially equivalent to the volume of portland cement and filler in portland cement concrete.

A suitable composition of the material for the manufacture of sulfur concrete articles according to the invention comprises in % by volume

| | |
|---|---|
| 5-30% | sulfur cement |
| 0-70% | coarse aggregate of a particle size of more than 4 mm |
| 10-80% | fine aggregate of a particle size of up to 4 mm |
| 3-40% | filler |
| 1-10% | air |
| 0-5% | reinforcing fibers |
| 0-10% | additives and/or adjuvants. |

A more preferred material comprises in % by volume

| | |
|---|---|
| 7-14% | sulfur cement |
| 30-45% | coarse aggregate |
| 28-40% | fine aggregate |
| 10-20% | filler |
| 2-6% | air |
| 0-3% | reinforcing fibers |
| 0-10% | additives and/or adjuvants. |

The method according to the invention for the manufacture of acid resistant concrete articles, especially sulfur concrete pipes, comprises the steps of
(1) formulating a composition of a sulfur concrete material on the basis of the composition of a portland cement concrete suitable for pipe manufacture by means of the dry casting method, replacing the volume of portland cement, filler and water by a substantially equivalent volume of sulfur cement and filler, and
(2) (a) mixing the components of the material and adjusting the obtained mixture to a temperature where sulfur cement is liquid,
(b) casting the mixture at this temperature while subjecting it to vigorous vibration, using a mould preheated to a temperature of up to 160° C.,
(c) removing the cast pipe from the mould. According to a preferred embodiment step 1 is carried out by formulating a composition of a sulfur concrete material on the basis of the composition of a portland cement concrete suitable for pipe manufacture by means of the dry casting method, replacing the volume of water by a substantially equivalent volume of sulfur cement and replacing the volume of portland cement and filler by a substantially equivalent volume of filler.

The inventive method can substantially be carried out as follows.

The major components, such as fine aggregate, coarse aggregate and sulfur cement, are preheated to between 130° and 160° C. Such a preheating considerably reduces the period for the adjustment of the mixture temperature for the casting. In practice, fine aggregate and coarse aggregate are each filled into its silo in an amount sufficient for one day's production of sulfur concrete. The aggregate is preheated inside the silo, for example electrically or by hot air. The manufacture starts by mixing the components in a mixer, such as a positive mixer, for example a pan mixer or a paddle mixer, and adjusting the mixture to a temperature, where the sulfur cement is liquid, i.e. to approx. 135° C. At this temperature the sulfur concrete is cast, using a plant for the dry method manufacture of portland cement concrete pipes. Examples of plants for carrying out the inventive method include pipe manufacturing plants with a vibrating inner core, for example available from Pedershaab Maskinfabrik, Bronderslev, Denmark, and plants with vibration tables, for example available from Betodan, Vejle, Denmark. The plant used may, for example, comprise a vibration table with an immobile core, an outer, removable mould and a removable bottom ring. Prior to the manufacture the casting mould is preheated to up to 160° C., preferably between 120° and 140° C., for example electrically or by means of hot air. The heating means used may advantageously be thermostat-controlled. It is necessary to preheat the casting mould to avoid a too rapid cooling of the sulfur concrete mixture, which would result in the sulfur cement solidifying and sticking to the casting mould. During continuous manufacture, i.e. at a manufacture rate of 8 to 10 pipes per hour, the heat transfer is expected to be sufficient for maintaining a suitable temperature of the casting mould. It might thus only be necessary to supply heat prior to starting the process. The casting mould can, if practical, be heat-insulated.

The sulfur concrete mixture is cast while subjected to vigorous vibration for approx. 4 min. The vibration causes a tight compaction of the aggregate particles, so that they together with the filler particles are almost in contact with each other, each particle only being surrounded by a thin layer of sulfur cement. Any known vibration means can be used in connection with the present invention. Such means include, for example, vibration tables or vibrating cores.

Subsequent to casting the outer mould and the sulfur concrete pipe are together lifted off the internal core by a crane gripping the bottom ring. The pipe is then placed on the bottom ring in such a way that the outer mould can be removed. The pipe does not collapse after removal of the outer mould.

If necessary form oil can be used in the casting mould to avoid a sticking of the sulfur concrete to the mould. This problem might also be solved by means of an anti-sticking coating, for example a polytetrafluoroethylene coating. The bottom ring should furthermore be preheated to a temperature of between 145° and 160° C. to ensure complete thermal expansion of the bottom ring prior to the solidification of the sulfur concrete pipe. If this is not ensured the pipe tightens around the bottom ring during the cooling. Such a tightening may prevent the removal of the pipe from the bottom ring, and the pipe may crack. To solve the above problems the bottom ring may be of a material having a higher coefficient of thermal expansion. It may also be possible to facilitate the removal of the pipe from the bottom ring by cooling the ring to for example 10° C. when the pipe has reached a temperature of for example 50° C. The strength of the sulfur concrete at this temperature permits this type of removal.

Upon the demoulding the sulfur concrete article has obtained sufficient strength for being moved after 2 to 4 hours, all depending on the thickness of the article in question. The articles can be delivered to a building or piping site the day after their manufacture. On the other hand, portland cement concrete articles have to harden for a period of approx. 28 days before they can be delivered. In contrast to conventional portland cement concrete production sulfur concrete articles can be manufactured 24 hours a day. This can be of importance since the costs involved in operating large, advanced pipe plants are considerable. The place required for storing sulfur concrete pipes is minimal and the short production time allows an adaptation of the production to current needs as well as fulfilling immediate demands of the customer.

Sulfur concrete articles harden by cooling. They do not deteriorate due to drying out, as may be the case in portland cement concrete articles. Therefore sulfur concrete articles are of a much more uniform quality than portland cement concrete articles. A further advantage is that sulfur concrete is a corrosion-resistant material per se. Finally it does not contain water allowing the manufacture of articles at temperatures below 0° C.

The method according to the invention is advantageously carried out in a casting mould preheated to a temperature of up to 160° C., preferably ranging between 80° to 150° C., more preferred between 100° to 145° C., even more preferred between 125° to 135° C. prior to casting. The preheating ensures that sulfur does not stick to the wall material of the mould, since sulfur has a melting point of approx. 120° C.

The above step (a) of the method according to the invention is advantageously carried out by adjusting the mixture to a temperature of between 120° and 150° C., preferably between 130° and 140° C., thus ensuring that sulfur is liquid.

For practical reasons one or more of the components of the material or mixtures of several components are individually preheated to a temperature of up to 170° C., preferably to between 130° and 160° C. Thus the time for adjusting the temperature is considerably shortened, as the obtained mixture already has a temperature close to the desired casting temperature.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The invention is described in greater detail below by means of the following, illustrative, non-limiting examples.

EXAMPLE 1

The present example describes an introductory run based upon a portland cement concrete composition usually used for the manufacture of pipes on the plant in question. The composition was as follows:

| Component | kg/m³ | l/m³ |
|---|---|---|
| portland cement | 280 | 89 |
| fly ash | 100 | 45 |
| fine aggregate 0–4 mm | 900 | 346 |
| coarse aggregate 4–8 mm | 900 | 346 |
| water | 132 | 132 |
| air | — | 40 |

The first column of the table, to wit, "Kg/m³," stands for kilograms per cubic meter, while the second column, i.e., "1/m³," refers to liters per cubic meter, the composition being thus stated in both weight and volume units.

During the first run only water was replaced by an equivalent volume of sulfur cement, i.e. in theory 251 kg/m³. In practice the desired consistency was obtained with a slightly lesser amount of sulfur cement.

In the absence of water portland cement does no longer act as a binder but merely as a filler. The resulting sulfur concrete mixture had the following composition:

| Composition 1 | | |
|---|---|---|
| Component | kg/m³ | l/m³ |
| portland cement | 288 | 92 |
| fly ash | 102 | 46 |
| fine aggregate 0-4 mm | 926 | 356 |
| coarse aggregate 4-8 mm | 926 | 356 |
| sulfur cement* | 209 | 110 |
| air | — | 40 |

*The sulfur cement used in all examples comprises 95% by weight of sulfur and 5% by weight of plasticizer in form of a mixture of dicyclopentadiene and oligomers of cyclopentadiene in a ratio of 1:1. This sulfur cement is available from KKKK A/S, Copenhagen, Denmark and from Chemical Enterprises, Houston, Texas, USA under the trademark CHEMENT® 2000.

Composition 1 was used to manufacture full-scale articles on an existing plant for the preparation of conventional portland cement concrete articles. During the run the concrete was cast at a temperature of approx. 135° C., and the mould used was preheated to a temperature of between 80° and 120° C. The mixture was cast in a manner conventionally used for portland cement subjecting the mixture to vigorous vibration for about 4 min. The concrete articles were removed from the mould immediately after casting.

Two different types of articles were cast: Euro pipe stoppers and GT cones. Euro pipe stoppers are used to close pipes ends. The manufactured Euro pipe stoppers are of a dimension suitable for pipes with an inner diameter of 60 cm. The shape of the Euro stoppers substantially corresponds to a cylindrical, flat-bottomed bowl, its cylinder having an inner diameter of 60 cm and its largest outer diameter being 76 cm. The bowl has a height of 15 cm and its bottom has a thickness of 8 cm. The manufactured GT cones has a height of 40 cm and an inner diameter at each end of 80 and 60 cm respectively. Their thickness is 6 cm. Both articles are comparatively simple in shape, but experience from the portland cement concrete manufacture has shown that they may tend to collapse when demoulded. With the exception of the two first attempts at manufacturing pipe stoppers, where no form oil was used, four Euro stoppers were manufactured without problems, whereupon five GT cones were manufactured without problems. A laboratory test revealed that articles manufactured from Composition 1 are crack-free and have an air content of 3.4%. Their compressive strength is higher than 55 MPa.

EXAMPLE 2

On the basis of Composition 1 a new mixture was prepared, where the portland cement was replaced by an equivalent volume of fly ash.

| Composition 2 | | |
|---|---|---|
| Component | kg/m³ | l/m³ |
| fly ash | 315 | 143 |
| fine aggregate 0-4 mm | 942 | 362 |
| coarse aggregate 4-8 mm | 942 | 362 |
| sulfur cement | 177 | 93 |
| air | — | 40 |

Using the same method as in Example 1, seven GT cones were manufactured without problems.

A laboratory test revealed that articles manufactured from Composition 2 are crack-free and have an air content of 3.1%. Their compressive strength is higher than 55 MPa.

EXAMPLE 3

Using the same method as in Examples 1 and 2, eight GT cones were manufactured without problems from the following composition:

| Composition 3 | | |
|---|---|---|
| Component | kg/m³ | l/m³ |
| fly ash | 313 | 142 |
| fine aggregate 0-4 mm | 838 | 322 |
| coarse aggregate 4-8 mm | 1047 | 403 |
| sulfur cement | 177 | 93 |
| air | — | 40 |

EXAMPLE 4

Full-scale GT pipes were cast on a conventional plant for the manufacture of portland cement concrete articles, said pipes having the following dimensions:
inner diameter: 60 cm
height: 200 cm
wall thickness: 8 cm
weight approx.: 1000 kg/article.

The plant used comprised a vibration table with an immobile core, an outer removable mould and a removable bottom ring. The outer mould was provided with a heat-insulating mantle. The mould was preheated to approx. 80° to 120° C. by means of hot air. Subsequent to casting the material while subjecting it to vigorous vibration for 4 min the pipe was lifted from the inner core by lifting the bottom ring by means of a crane. The bottom ring was placed on the ground, whereupon the outer mould was removed.

Seven pipes were thus manufactured without problems from the following composition:

| Composition 4 | | |
|---|---|---|
| Component | kg/m³ | l/m³ |
| fly ash | 320 | 145 |
| fine aggregate 0-4 mm | 850 | 327 |
| coarse aggregate 4-8 mm | 430 | 165 |
| coarse aggregate 8-12 mm | 600 | 240 |
| sulfur cement | 186 | 98 |
| air | — | 25 |

A destructive test for determining the load capacity of the pipe was carried out by Dantest, Copenhagen, Denmark. This test comprises subjecting the pipe to a vertical load perpendicular to the generatrix of the pipe cylinder until breaking. The breaking strength was measured to be 233 kN. The required minimum breaking strength of GT pipes of the manufactured type is 118 kN. The breaking strength of the manufactured pipes is thus 97% higher than required. A comparable portland cement concrete pipe of the above type has usually a breaking strength of 30 to 50% above the required minimum.

EXAMPLE 5

Using the method described in Example 4 five GT pipes were manufactured without problems from a sulfur concrete reinforced with polypropylene fibers and having the following composition:

| Composition 5 | | |
| --- | --- | --- |
| Component | kg/m³ | 1/m³ |
| fly ash | 300 | 136 |
| fine aggregate 0–4 mm | 820 | 315 |
| coarse aggregate 4–8 mm | 410 | 158 |
| coarse aggregate 8–12 mm | 600 | 240 |
| sulfur cement | 200 | 105 |
| KRENIT ® -fibers* | 17 | 17 |
| air | — | 29 |

*Polypropylene fibers of a length of 12 mm, a thickness of between 20 and 40 μm and a width of between 100 and 300 μm; available from Danaklon A/S, Varde, Denmark.

The manufactured pipes have a breaking strength of 280 kN corresponding to 137% above the minimum requirement.

Examples 1 to 5 show that a person skilled in the art can formulate the required material in a simple manner from known compositions of a portland cement concrete material suitable for the manufacture of pipes according to the dry casting method. The inventive method requires only small adjustments of theoretically calculated compositions to obtain a sulfur concrete composition suitable for the manufacture of pipes, such adjustments being well-known to a person skilled in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of manufacturing acid resistant concrete pipes from sulfur concrete by the dry casting method which consists essentially of the steps of:
    (a) formulating a concrete composition from components consisting essentially in percent by volume of about 5 to 30% sulfur, up to about 70% coarse aggregate of particle size greater than 4 mm, about 10% to 80% fine aggregate of particle size up to 4 mm, about 3 to 40% filler, about 1 to 10% air, 0 to about 5% reinforcing fibers and 0 to 10% additives and/or adjuvants,
    said amount of sulfur being sufficient when mixed with the composition to provide a dry mix when melted
    (b) mixing said components heated to a temperature at which said sulfur is liquid,
    (c) casting the mixture at said temperature into a pipe mold while subjecting said mold to vigorous vibration, said mold being preheated to a temperature ranging up to about 160° C., and
    (d) then removing the cast pipe from said mold following completion of casting.

2. A method as in claim 1, wherein the mold used in step (c) is preheated to a temperature ranging between about 80° and 150° C.

3. A method as in claim 1, wherein the mold used in step (c) is preheated to a temperature ranging between 100° and 145° C.

4. A method as in claim 1, wherein the mold used in step (c) is preheated to a temperature ranging between about 120° and 140° C.

5. A method as in claim 1, wherein step (b) is carried out by mixing the components of the material and adjusting the temperature thereof to between about 120° and 150° C.

6. A method as in claim 5, wherein the mixed components are provided at a temperature of between about 130° and 140° C.

7. A method of manufacturing acid resistant concrete pipes from sulfur concrete by the dry casting method which consists essentially of the steps of:
    (a) formulating a concrete composition from components consisting essentially in a percent by volume of about 7 to 14% sulfur, up to about 70% coarse aggregate of particle size greater than 4 mm, about 10% to 80% fine aggregate of particle size up to 4 mm, about 3 to 40% filler, about 1 to 10% air, 0 to about 5% reinforcing fibers and 0 to 10% additives and/or adjuvants, said amount of sulfur being sufficient when mixed with the composition to provide a dry mix when melted,
    (b) mixing said components heated to a temperature at which said sulfur is liquid,
    (c) casting the mixture at said temperature into a pipe mold while subjecting said mold to vigorous vibration, said mold being preheated to a temperature of up to about 160° C., and
    (d) then removing the cast pipe from said mold following completion of casting.

8. A method as in claim 7, wherein the mold used in step (c) is preheated to a temperature ranging between about 80° and 150° C.

9. A method as in claim 7, wherein the mold used in step (c) is preheated to a temperature ranging between about 100° and 145° C.

10. A method as in claim 7, wherein the mold used in step (c) is preheated to a temperature ranging between about 120° and 140° C.

11. A method as in claim 7, wherein step (b) is carried out by mixing the components of the material and adjusting the temperature thereof to between about 120° and 150° C.

12. A method as in claim 11, wherein the mixed components are provided at a temperature of between about 130° and 140° C.

13. The method of claim 7, wherein the composition ranges from about 30 to 45% coarse aggregate of particle size large than 4 mm, about 28 to 40% fine aggregate of particle size up to 4 mm, about 10 to 20% filler, about 2 to 6% air, 0 to about 3% reinforcing fibers and 0 to about 10% additives and/or adjuvants.

14. A sulfur concrete pipe produced in accordance with the method of claim 1.

15. A sulfur concrete pipe produced in accordance with the method of claim 7.

* * * * *